(12) United States Patent
Mori et al.

(10) Patent No.: US 11,640,048 B2
(45) Date of Patent: May 2, 2023

(54) ZOOM LENS AND IMAGE PICKUP APPARATUS AND IMAGE PICKUP SYSTEM HAVING THE SAME

(71) Applicant: CANON KABUSHIKI KAISHA, Tokyo (JP)

(72) Inventors: Takeo Mori, Tochigi (JP); Akira Mizuma, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 183 days.

(21) Appl. No.: 17/154,171

(22) Filed: Jan. 21, 2021

(65) Prior Publication Data
US 2021/0231931 A1 Jul. 29, 2021

(30) Foreign Application Priority Data
Jan. 27, 2020 (JP) .............................. JP2020-010541

(51) Int. Cl.
*G02B 15/14* (2006.01)
*H04N 23/69* (2023.01)
*H04N 23/63* (2023.01)

(52) U.S. Cl.
CPC .. *G02B 15/144113* (2019.08); *G02B 15/1461* (2019.08); *G02B 15/145113* (2019.08); *H04N 23/633* (2023.01); *H04N 23/69* (2023.01)

(58) Field of Classification Search
None
See application file for complete search history.

(56) References Cited

U.S. PATENT DOCUMENTS

| 5,699,198 A | 12/1997 | Inadome et al. |
| 9,829,681 B2 | 11/2017 | Mori |

(Continued)

FOREIGN PATENT DOCUMENTS

| CN | 102445747 A | 5/2012 |
| CN | 103837969 A | 6/2014 |

(Continued)

OTHER PUBLICATIONS

Gross, H. et al., "Handbook of Optical Systems," vol. 3: Aberration Theory and Correction of Optical Systems, Chapter 31: Correction of Aberrations, Wiley-VCH, XP002719371, Jan. 1, 2007, pp. 215-221, and 225.

(Continued)

*Primary Examiner* — James M Hannett
(74) *Attorney, Agent, or Firm* — Carter, DeLuca & Farrell LLP

(57) ABSTRACT

A zoom lens including, in order from object side to image side, first to fourth lens units respectively having positive, negative, positive, and positive refractive powers. During zooming from a wide-angle end to a telephoto end, the first lens unit is arranged to move, the distance between the first lens unit and the second lens unit increases, the distance between the second lens unit and the third lens unit decreases, and the distance between the third lens unit and the fourth lens unit decreases. The second lens unit consists of a first lens having a negative refractive power and a second lens having a positive refractive power, the second lens being disposed on the image side of the first lens. A predetermined condition is satisfied.

15 Claims, 15 Drawing Sheets

(56) References Cited

U.S. PATENT DOCUMENTS

| | | |
|---|---|---|
| 10,670,832 B2 | 6/2020 | Mori |
| 10,887,510 B2 | 1/2021 | Mori |
| 2003/0231388 A1* | 12/2003 | Hamano ............... G02B 27/646 |
| | | 359/432 |
| 2005/0243438 A1* | 11/2005 | Hamano ........ G02B 15/144113 |
| | | 359/692 |
| 2008/0170300 A1 | 7/2008 | Kanetaka et al. |
| 2010/0321792 A1 | 12/2010 | Yamagami |
| 2012/0206819 A1 | 8/2012 | Kanetaka et al. |
| 2014/0211029 A1* | 7/2014 | Okumura ............. G02B 15/173 |
| | | 359/557 |
| 2014/0240554 A1* | 8/2014 | Uchida .............. H04N 5/23209 |
| | | 348/240.99 |
| 2017/0322399 A1* | 11/2017 | Sugita ................... G02B 15/163 |
| 2019/0149727 A1* | 5/2019 | Mori .................. H04N 5/23212 |
| | | 348/222.1 |
| 2020/0400919 A1 | 12/2020 | Shinohara et al. |
| 2021/0231931 A1* | 7/2021 | Mori .............. G02B 15/145113 |

FOREIGN PATENT DOCUMENTS

| | | |
|---|---|---|
| CN | 103969812 A | 8/2014 |
| CN | 108983404 A | 12/2018 |
| JP | 2004258240 A | 9/2004 |
| JP | 2009-168933 A | 7/2009 |
| JP | 2018169563 A | 11/2018 |

OTHER PUBLICATIONS

Extended European Search Report issued by the European Patent Office dated Jun. 18, 2021 in corresponding EP Patent Application No. 21153296.5.

Notification of the First Office Action issued by the China National Intellectual Property Administration dated Jul. 21, 2022 in corresponding CN Patent Application No. 202110086485.0, with English translation.

* cited by examiner

ZOOM LENS AND IMAGE PICKUP APPARATUS AND IMAGE PICKUP SYSTEM HAVING THE SAME

BACKGROUND OF THE INVENTION

Field of the Invention

The present invention relates to a zoom lens suitable for a digital video camera, a digital still camera, a broadcast camera, a silver-halide film camera, a monitoring camera, and the like.

Description of the Related Art

In recent years, image pickup apparatuses have been reducing in size, and image sensors used in the image pickup apparatuses have been made to have an increased number of pixels. Optical systems used in the image pickup apparatuses are required to have high optical performance, small size, and reduced weight. In order to satisfy these requirements, a zoom lens is proposed which includes, in order from an object side to an image side, first to fifth lens units having positive, negative, positive, positive, and negative refractive powers and which reduces various aberrations (Japanese Patent Laid-Open No. 2009-168933).

In order to reduce the size of a zoom lens, it is effective to use a telephoto type power configuration at a telephoto end and to increase a positive refractive power on the object side and a negative refractive power on the image side. However, if the refractive power of each lens unit increases, fluctuation increases in various aberrations caused by zooming, and it becomes difficult to correct the various aberrations well with a small number of lenses. Therefore, it is important to properly set the refractive power and lens configuration of each lens unit in order for the zoom lens to have both small size and reduced weight.

SUMMARY OF THE INVENTION

The present invention provides a zoom lens that has high optical performance over an entire zoom range while having a small size and a reduced weight, and an image pickup apparatus and an image pickup system having the same.

A zoom lens including, in order from object side to image side, first to fourth lens units respectively having positive, negative, positive, and positive refractive powers. During zooming from a wide-angle end to a telephoto end, the first lens unit is arranged to move, the distance between the first lens unit and the second lens unit increases, the distance between the second lens unit and the third lens unit decreases, and the distance between the third lens unit and the fourth lens unit decreases. The second lens unit consists of a first lens having a negative refractive power and a second lens having a positive refractive power, the second lens being disposed on the image side of the first lens. A predetermined condition is satisfied.

An image pickup apparatus and an image pickup system including the above zoom lens also constitute other aspects of the present invention.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

DESCRIPTION OF THE EMBODIMENTS

Figure 1:
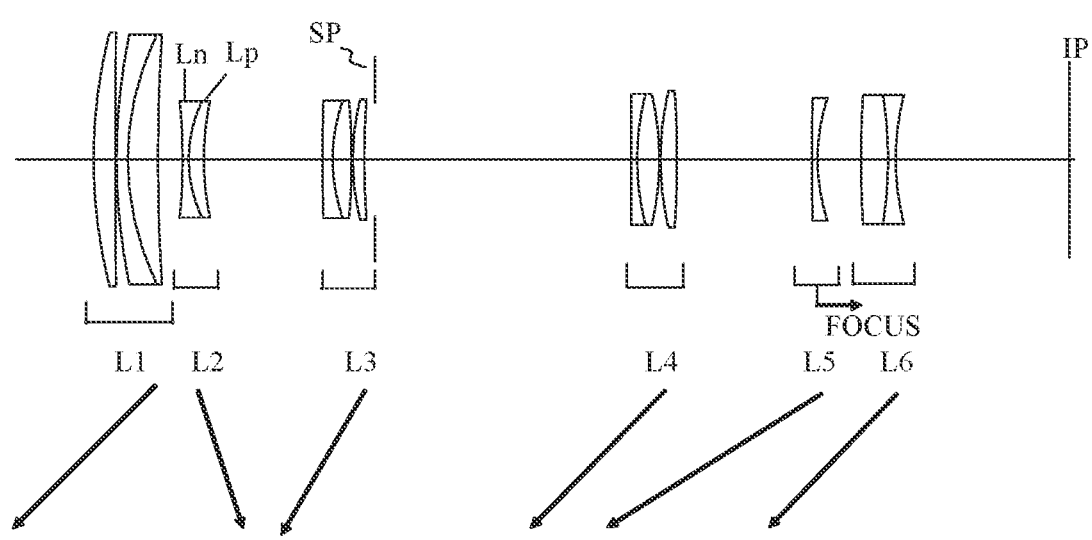
FIG. 1 is a sectional view illustrating a zoom lens at a wide-angle end according to a first embodiment.
Figure 2A:
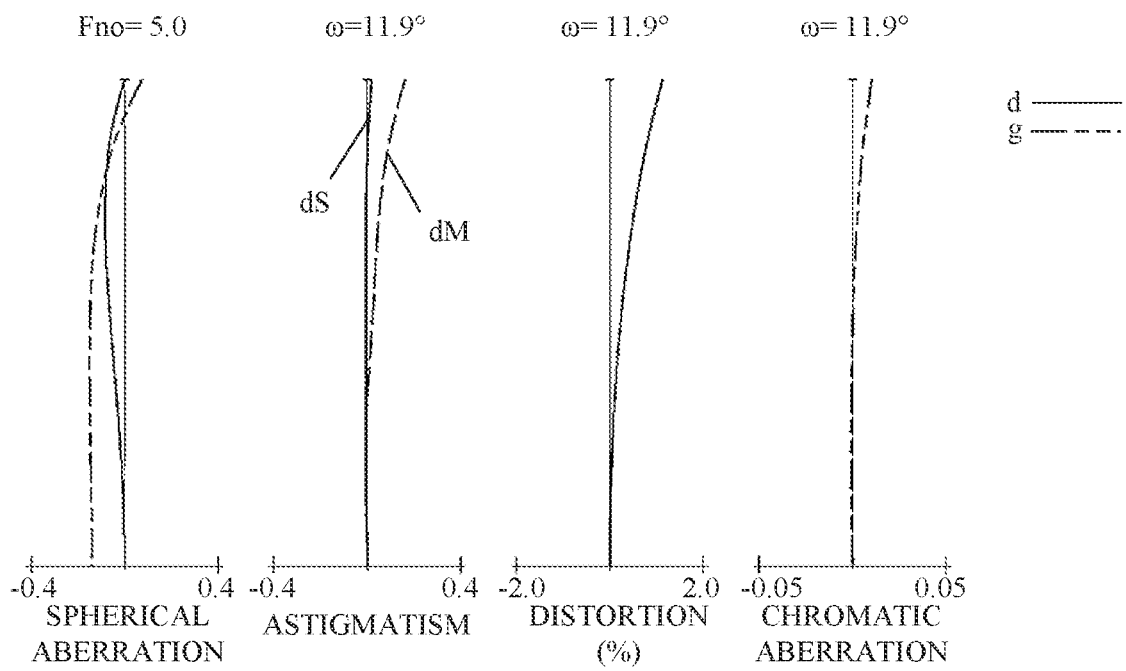
FIGS. 2A and 2B are aberration diagrams at the wide-angle end and a telephoto end, at a time of focusing on an object at infinity according to the first embodiment.
Figure 2B:
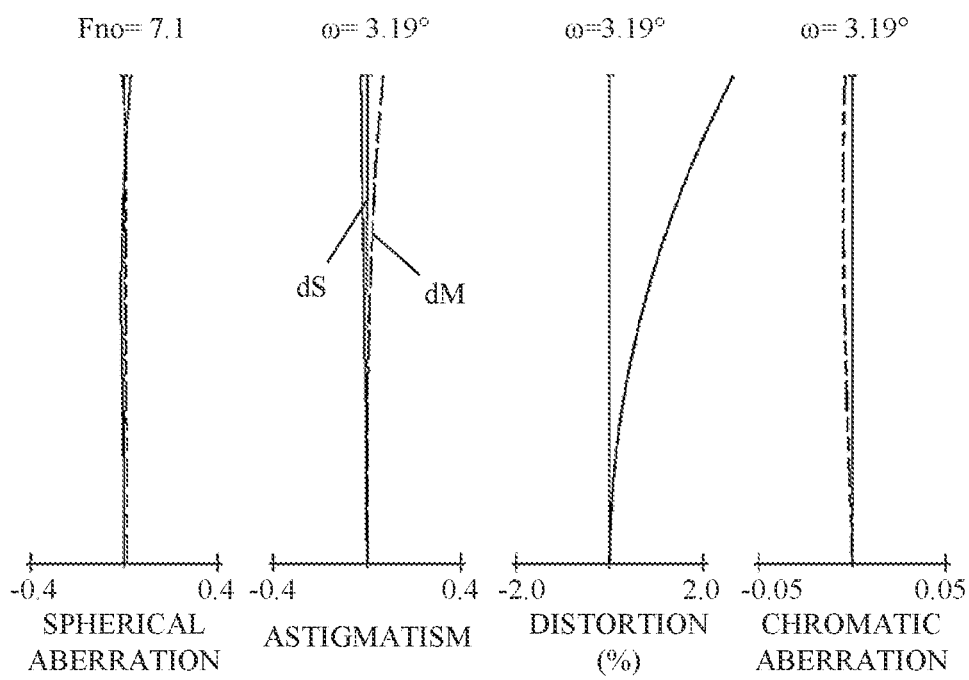
Figure 3:
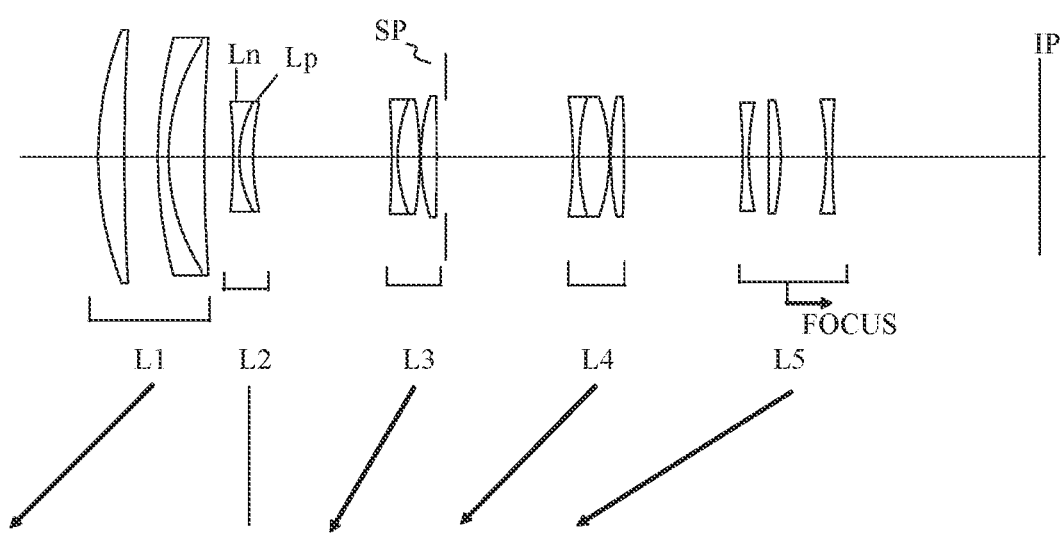
FIG. 3 is a sectional view illustrating a zoom lens at a wide-angle end according to a second embodiment.
Figure 4A:
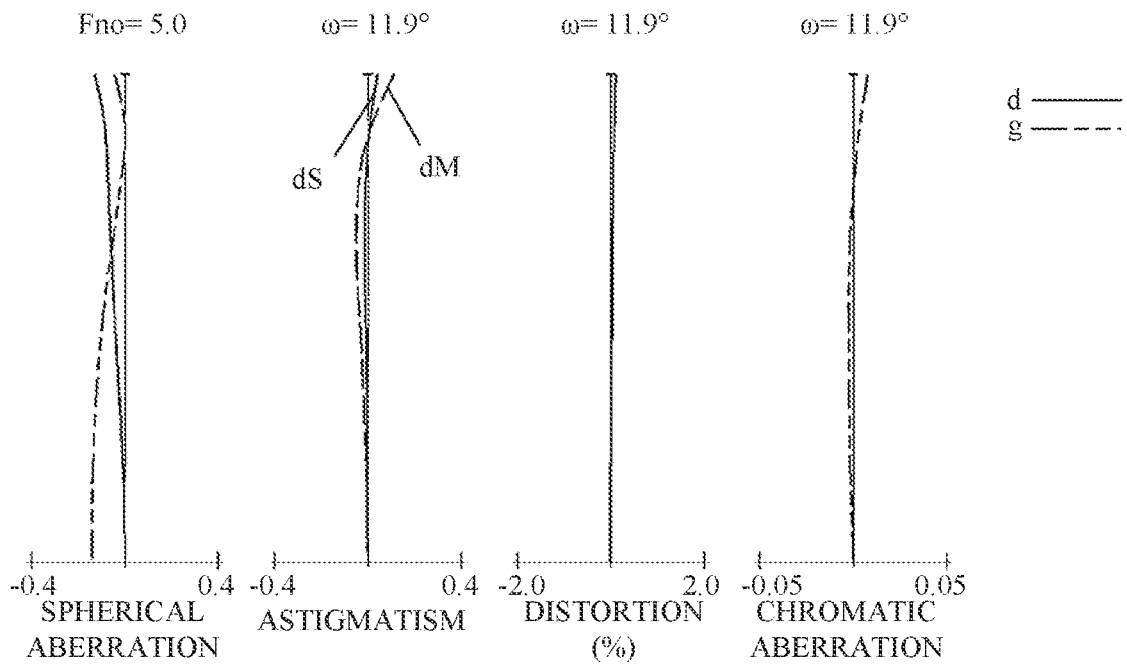
FIGS. 4A and 4B are aberration diagrams at the wide-angle end and a telephoto end, at a time of focusing on an object at infinity according to the second embodiment.
Figure 4B:
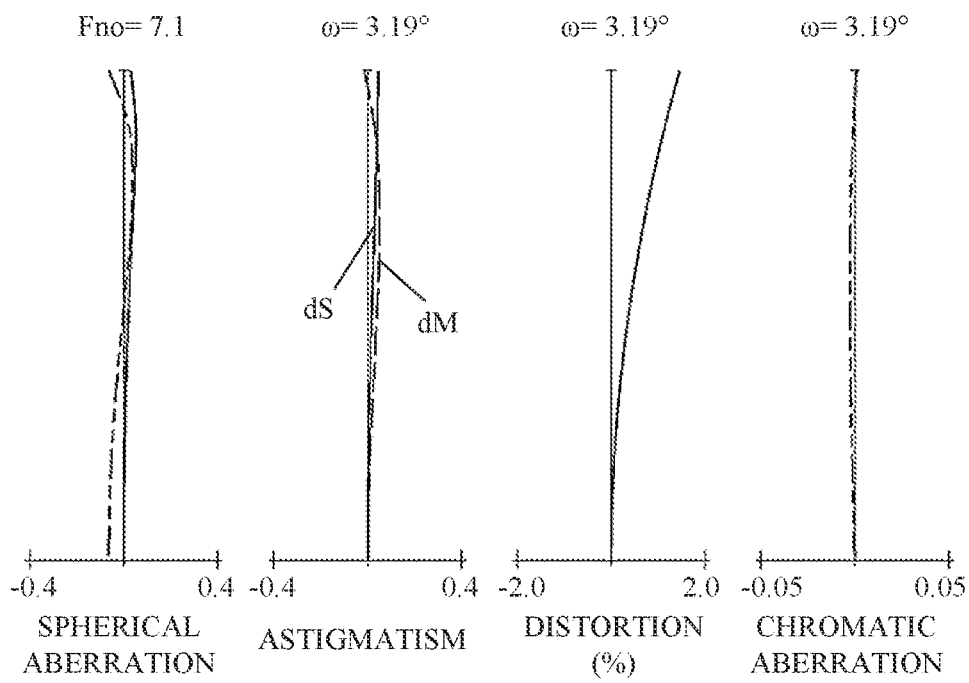
Figure 5:
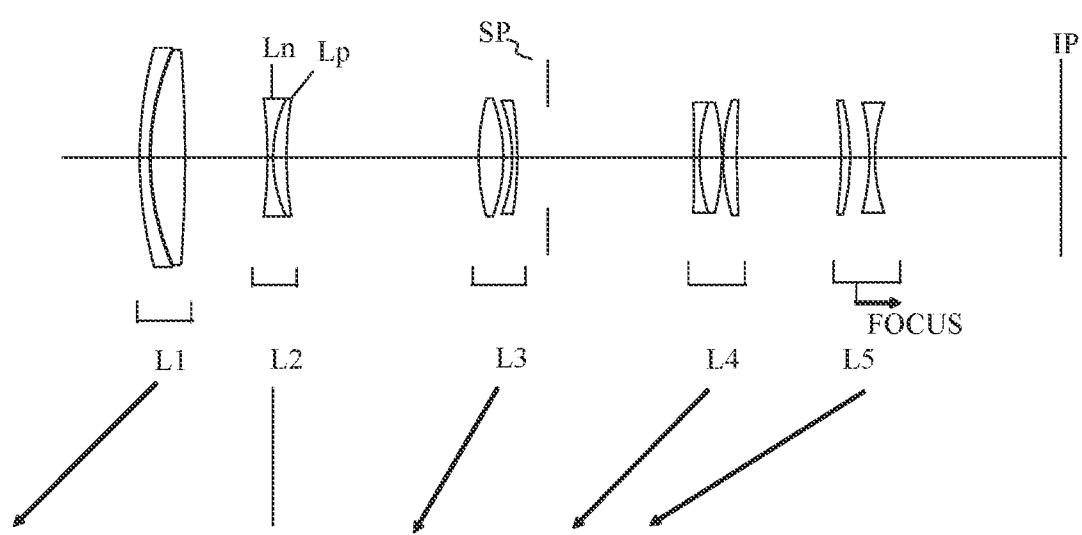
FIG. 5 is a sectional view illustrating a zoom lens at a wide-angle end according to a third embodiment.
Figure 6A:
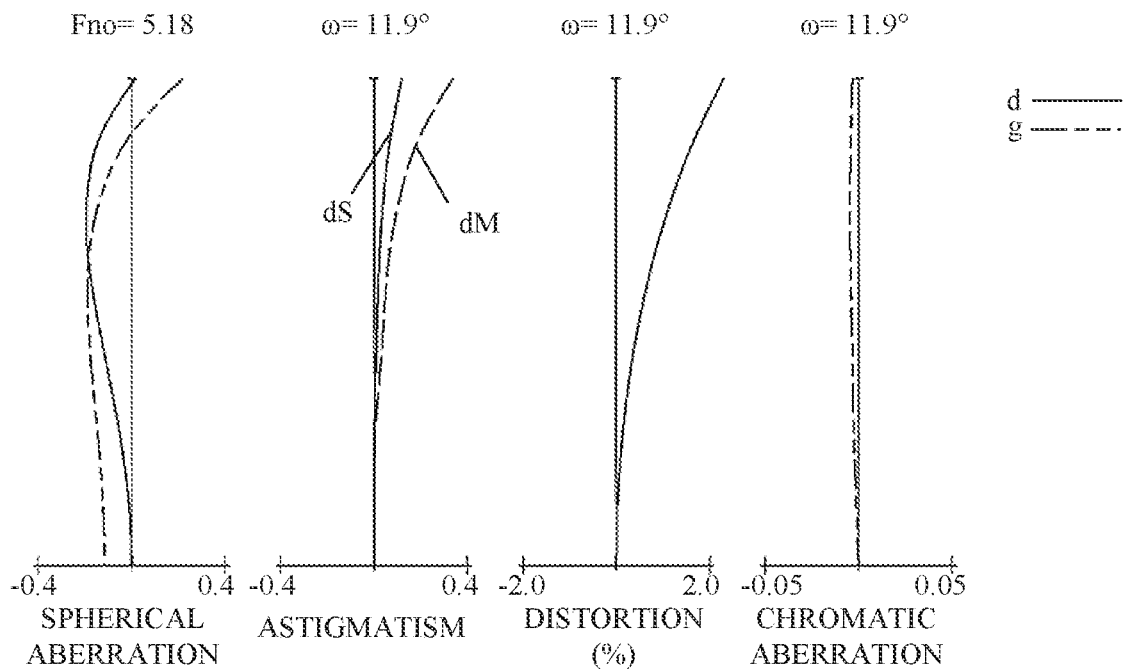
FIGS. 6A and 6B are aberration diagrams at the wide-angle end and a telephoto end, at a time of focusing on an object at infinity according to the third embodiment.
Figure 6B:
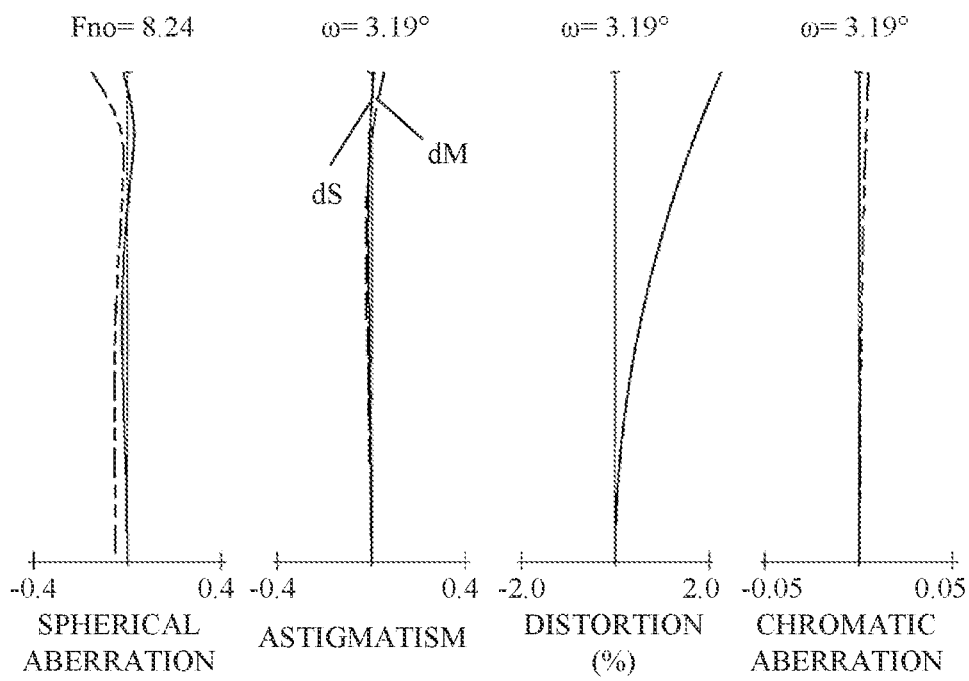
Figure 7:
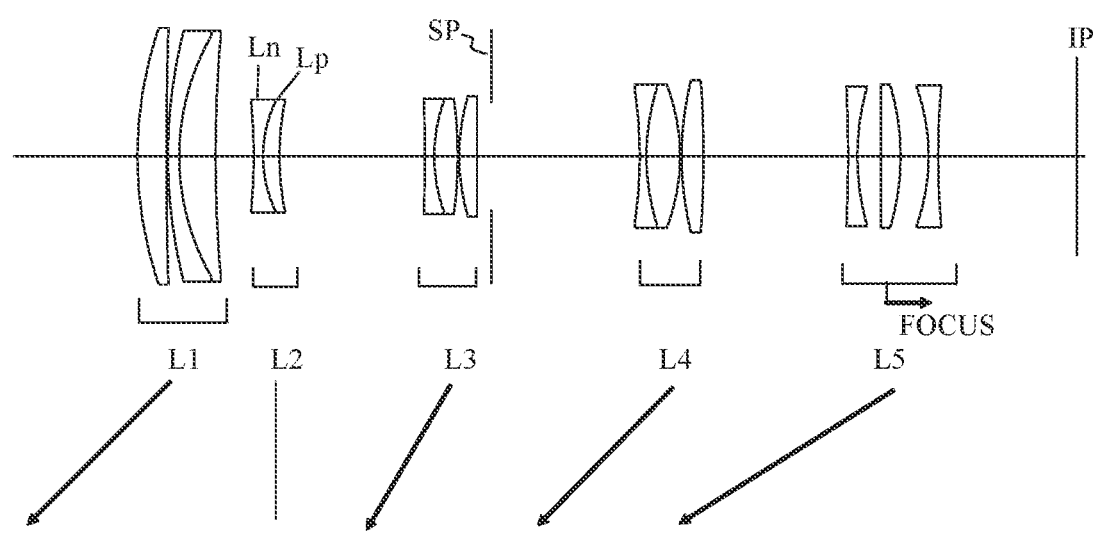
FIG. 7 is a sectional view illustrating a zoom lens at a wide-angle end according to a fourth embodiment.
Figure 8A:
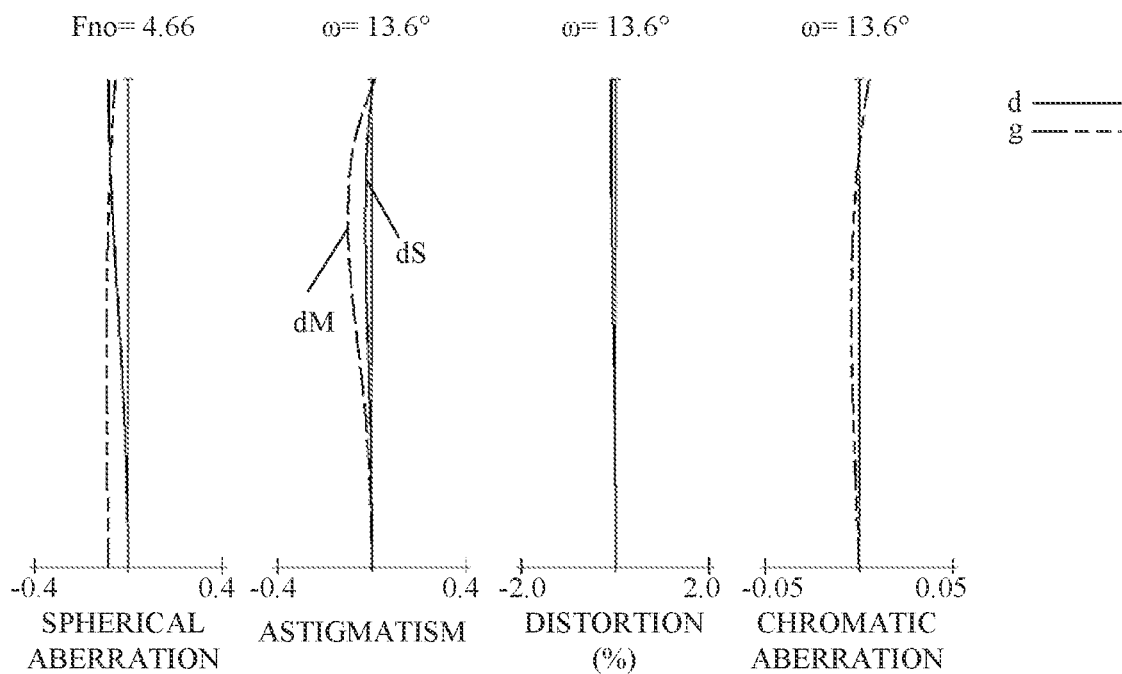
FIGS. 8A and 8B are aberration diagrams at the wide-angle end and a telephoto end, at a time of focusing on an object at infinity according to the fourth embodiment.
Figure 8B:
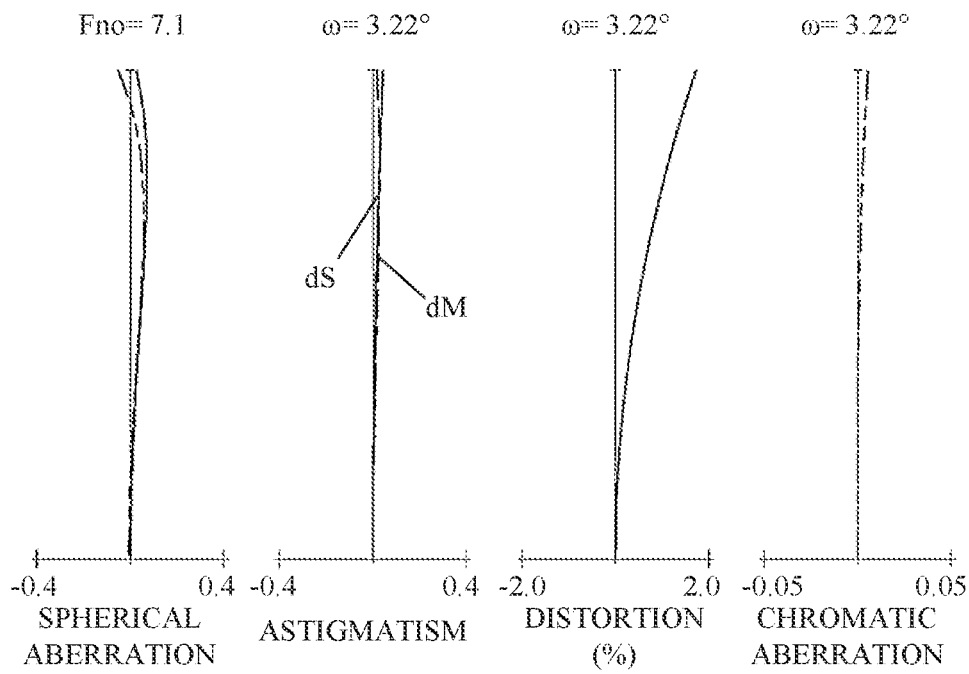
Figure 9:
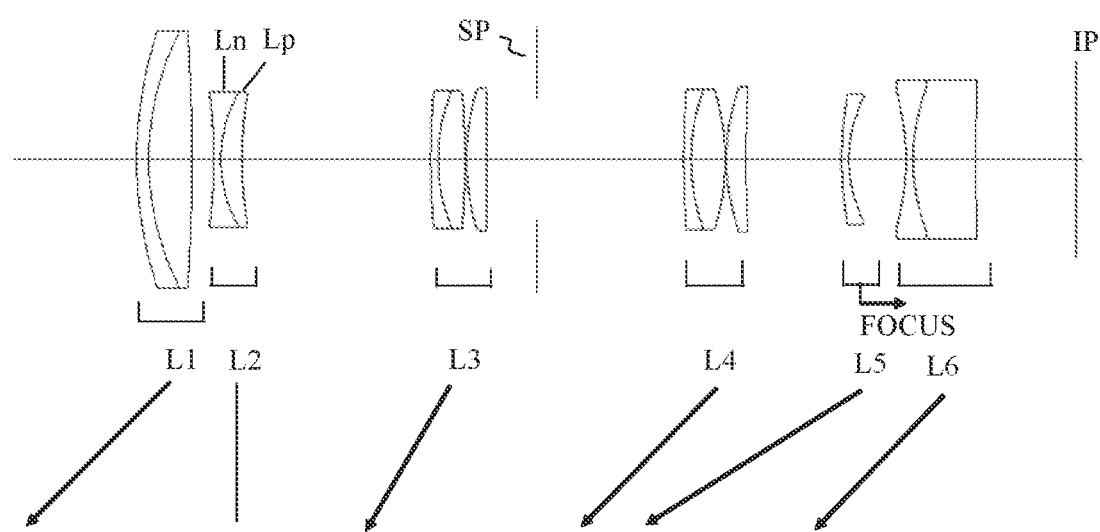
FIG. 9 is a sectional view illustrating a zoom lens at a wide-angle end according to a fifth embodiment.
Figure 10A:
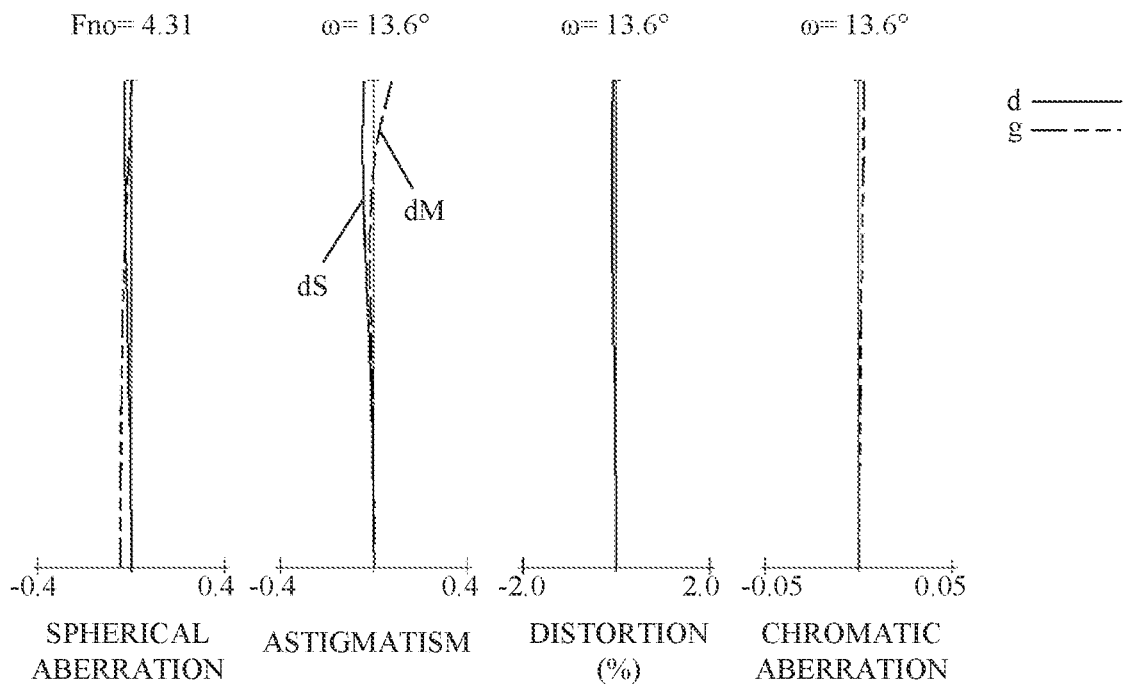
FIGS. 10A and 10B are aberration diagrams at the wide-angle end and a telephoto end, at a time of focusing on an object at infinity according to the fifth embodiment.
Figure 10B:
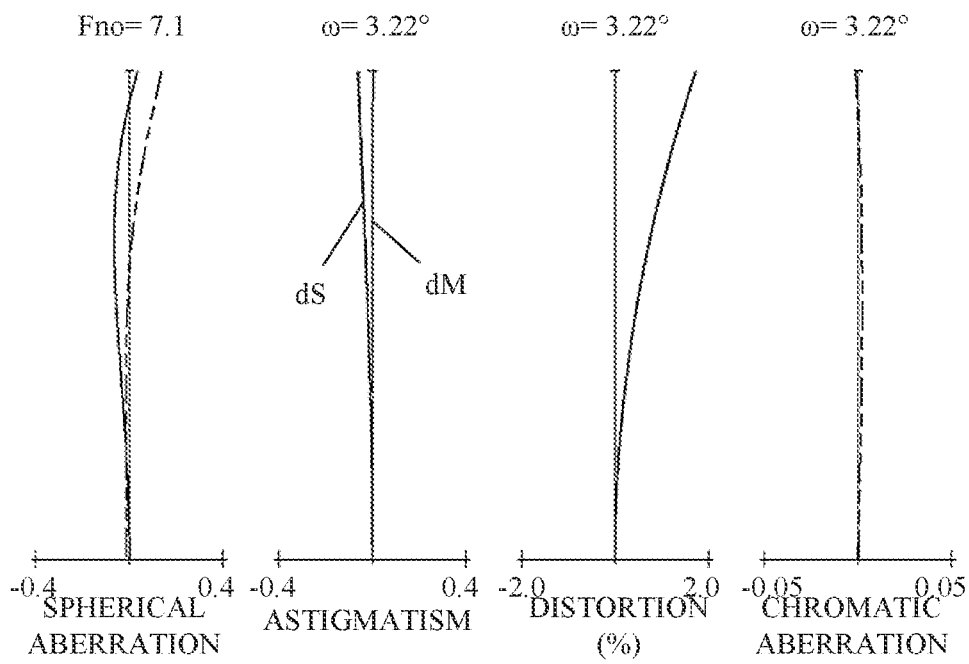
Figure 11:
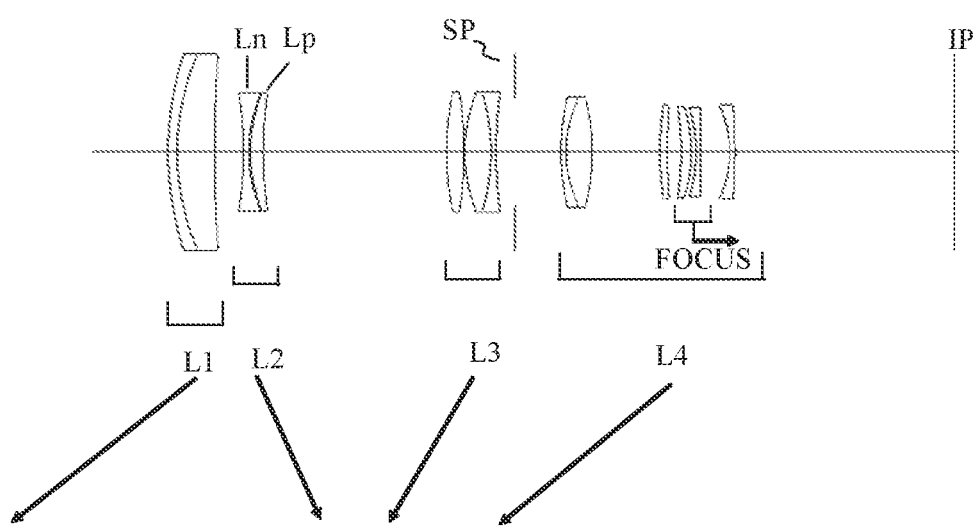
FIG. 11 is a sectional view illustrating a zoom lens at a wide-angle end according to a sixth embodiment.
Figure 12A:
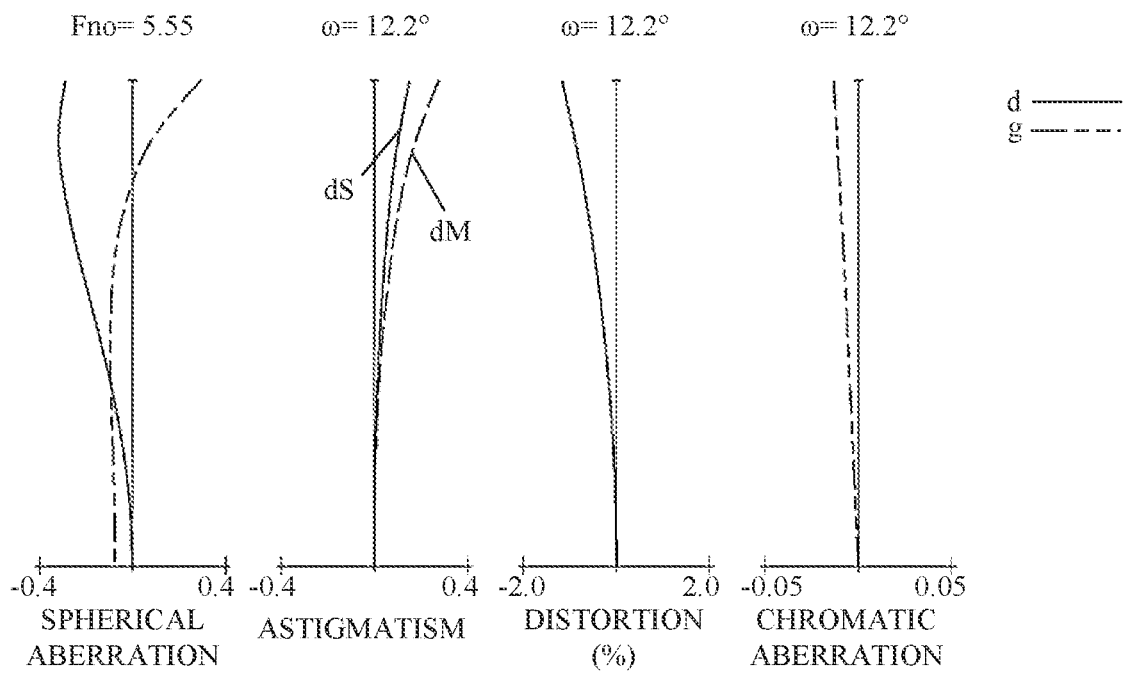
FIGS. 12A and 12B are aberration diagrams at the wide-angle end and a telephoto end, at a time of focusing on an object at infinity according to the sixth embodiment.
Figure 12B:
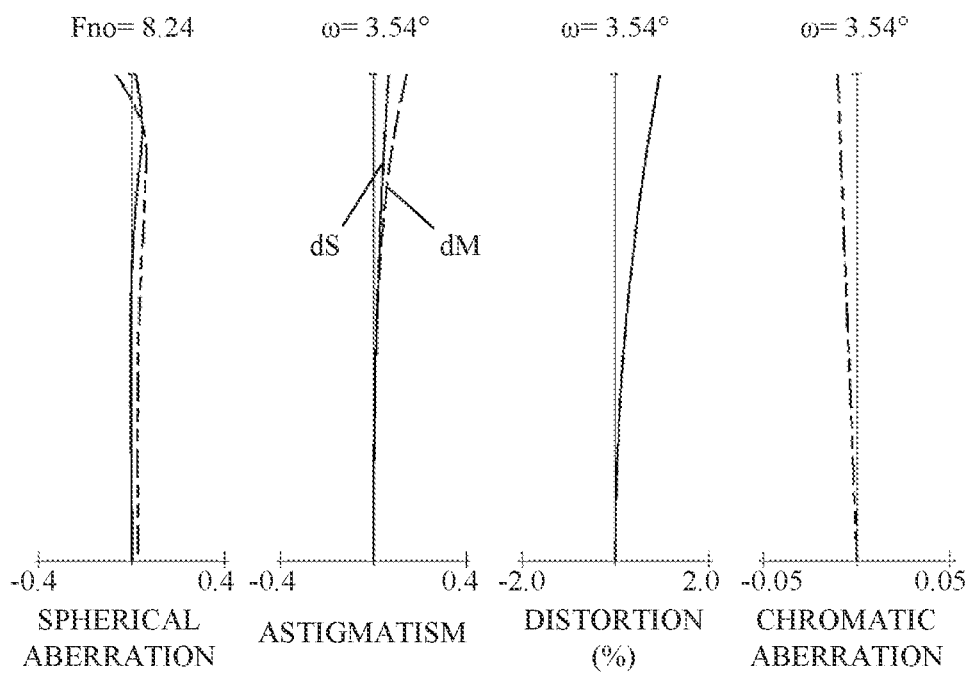
Figure 13:
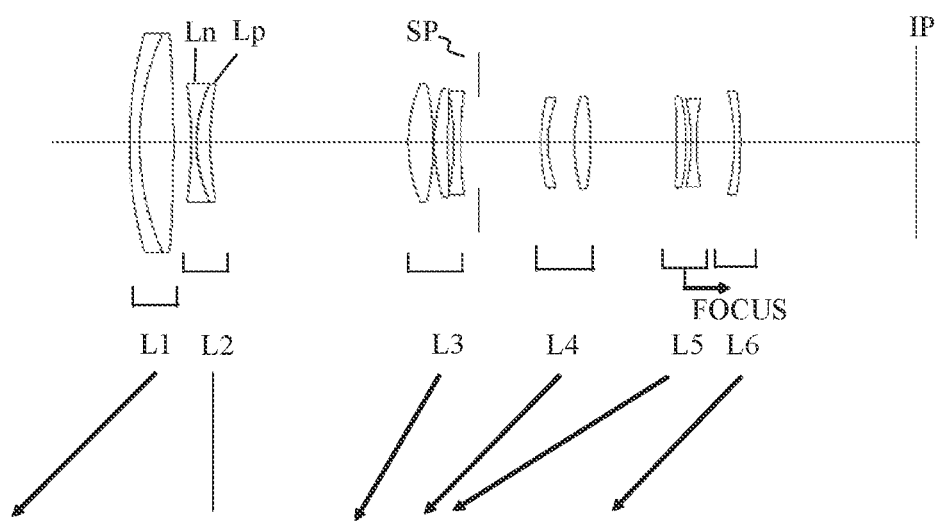
FIG. 13 is a sectional view illustrating a zoom lens at a wide-angle end according to a seventh embodiment.
Figure 14A:
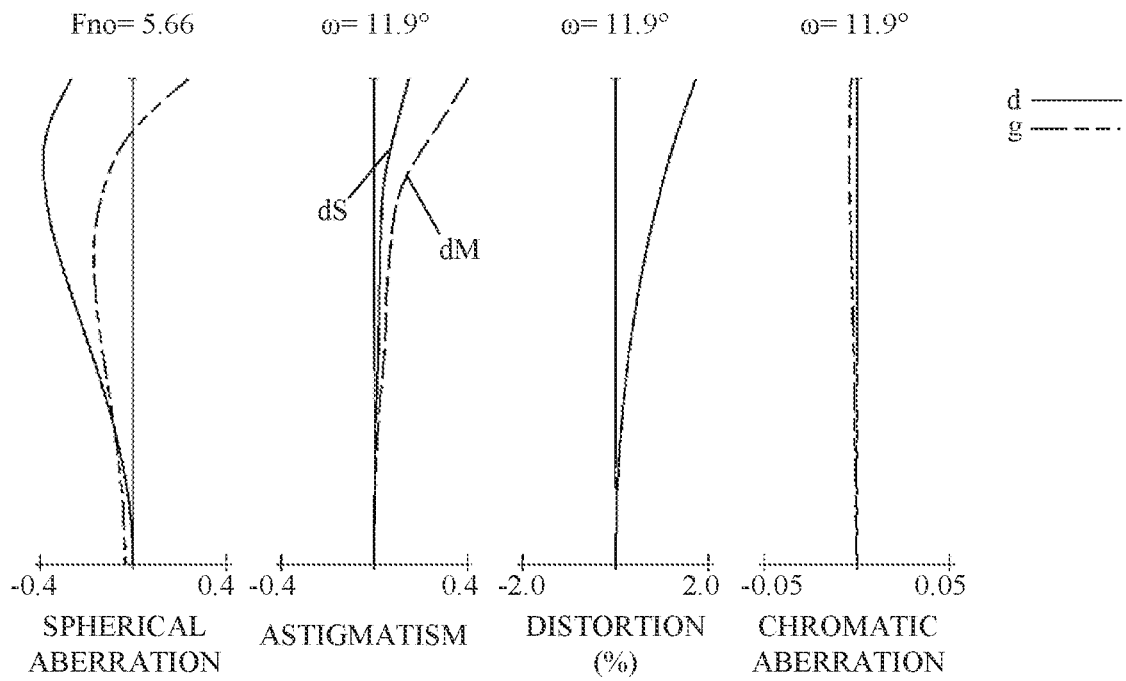
FIGS. 14A and 14B are aberration diagrams at the wide-angle end and a telephoto end, at a time of focusing on an object at infinity according to the seventh embodiment.
Figure 14B:
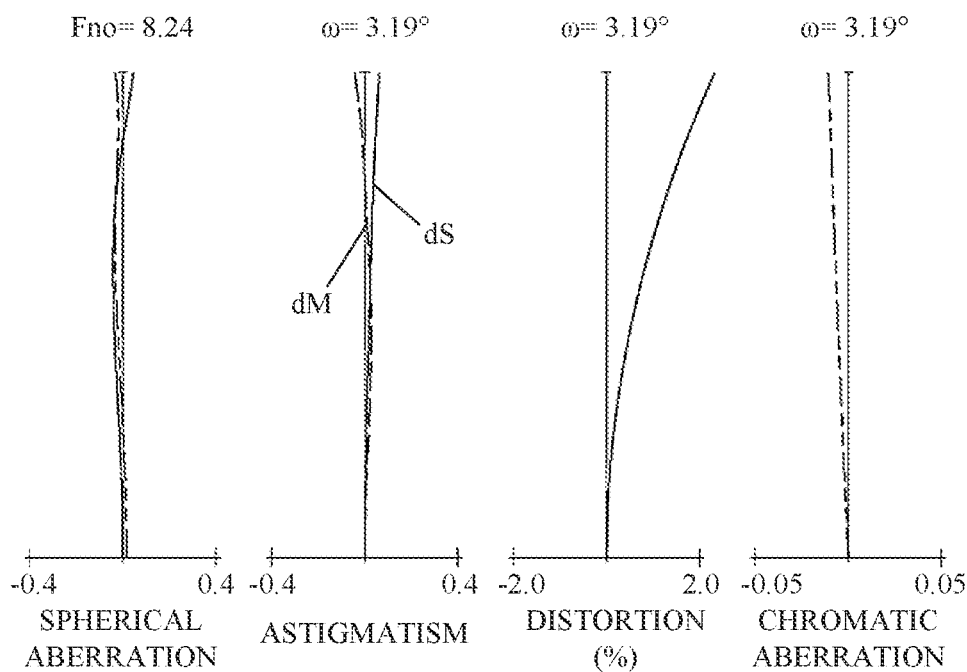

Referring now to the accompanying drawings, a description will be given of embodiments according to the present invention. Corresponding elements in respective figures will be designated by the same reference numerals, and a description thereof will be omitted.

FIGS. 1, 3, 5, 7, 9, 11 and 13 are sectional views each illustrating a zoom lens at a wide-angle end according to each of the first to seventh embodiments. The zoom lens according to each embodiment is used in an image pickup apparatus such as a digital video camera, a digital still camera, a broadcast camera, a silver-halide film camera, and a monitoring camera.

In each sectional view, a left side is an object side and a right side is an image side. The zoom lens according to each embodiment is configured to include a plurality of lens units. In the specification of the present application, a lens unit is a group of lenses that move or stop integrally during zooming. That is, in the zoom lens according to each embodiment, each distance between adjacent lens units changes during zooming. Arrows described in each sectional view represent moving directions of the lens units during zooming. The lens unit may consist of a single lens or may consist of a plurality of lenses. The lens unit may include an aperture stop (diaphragm).

The zoom lens according to each embodiment includes, in order from the object side to the image side, a first lens unit L having a positive refractive power, a second lens unit L2 having a negative refractive power, a third lens unit L3 having a positive refractive power, and a fourth lens unit L4 having a positive refractive power.

In each sectional view, Li represents an i-th (i is a natural number) lens unit among the lens units included in the zoom lens, the i-th lens unit being counted from the object side.

SP represents an aperture stop. IP represents an image plane. When the zoom lens according to each embodiment is used as an image pickup optical system of a digital still camera or a digital video camera, on the image plane IP, an image pickup plane is disposed of a solid image sensor (photoelectric conversion element) such as a CCD sensor or CMOS sensor. When the zoom lens according to each embodiment is used as an image pickup optical system of a silver-halide film camera, on the image plane IP, a photosensitive surface corresponding to a film surface is disposed.

Each of FIGS. 2A, 4A, 6A, 8A, 10A, 12A, and 14A is an aberration diagram of the zoom lens at the wide-angle end, at a time of focusing on an object at infinity according to each of the first to seventh embodiments. Each of FIGS. 2B, 4B, 6B, 8B, 10B, 12B, and 14B is an aberration diagram of the zoom lens at a telephoto end, at a time of focusing on an object at infinity according to each of the first to seventh embodiments.

In each spherical aberration diagram, Fno represents an F-number, and spherical aberration amounts are indicated for d-line (wavelength 587.6 nm) and g-line (wavelength 435.8 nm). In each astigmatism diagram, dS indicates an amount of astigmatism on a sagittal image plane, and dM indicates an amount of astigmatism on a meridional image plane. Each distortion diagram indicates an amount of distortion for the d-line. Each chromatic aberration diagram indicates an amount of chromatic aberration for the g-line. ω represents an image pickup half angle of view (°).

Next, a description will be given of a characteristic configuration of the zoom lens according to each embodiment.

During zooming from the wide-angle end to the telephoto end, the first lens unit L1 moves, a distance between the first lens unit L1 and the second lens unit L2 increases, a distance between the second lens unit L2 and the third lens unit L3 decreases, and a distance between the third lens unit L3 and the fourth lens unit L4 decreases. This configuration takes a telephoto type power configuration at the telephoto end, which is advantageous for reducing an overall length of the zoom lens.

The second lens unit L2 includes a negative lens (first lens) Ln and a positive lens (second lens) Lp, in order from the object side to the image side. The second lens unit L2 includes a small number of lenses, making it advantageous for weight reduction.

The zoom lens according to each embodiment satisfies a following conditional expression (1) where f2 represents a focal length of the second lens unit L2 and ft represents a focal length of the zoom lens at the telephoto end.

$$-0.3 < f2/ft < 0.0 \quad (1)$$

The conditional expression (1) specifies the focal length of the second lens unit L2 and the focal length of the zoom lens at the telephoto end. If the negative refractive power of the second lens unit L2 is so weak that the value is smaller than the lower limit of the conditional expression (1), a moving amount of each lens unit required for magnification variation increases, and the size of the zoom lens may increase. If the negative refractive power of the second lens unit L2 is so strong that the value is larger than the upper limit of the conditional expression (1), fluctuation may increase in spherical aberration and coma which are caused by zooming.

The numerical range of the conditional expression (1) may be set to a numerical range of a following conditional expression (1a).

$$-0.25 < f2/ft < -0.05 \quad (1a)$$

The numerical range of the conditional expression (1) may be set to a numerical range of a following conditional expression (b).

$$-0.20 < f2/ft < -0.10 \quad (1b)$$

The zoom lens according to each embodiment may satisfy a following conditional expression (2) where R1n represents a curvature radius of a lens surface on the object side of the negative lens Ln and R2n represents a curvature radius of a lens surface on the image side of the negative lens Ln.

$$-1.0 < (R2n+R1n)/(R2n-R1n) < -0.2 \quad (2)$$

The conditional expression (2) specifies a shape of the negative lens Ln. If the curvature radius of the lens surface on the image side of the negative lens Ln is so small that the value is smaller than the lower limit of the conditional expression (2), it may become difficult to process the lens. If absolute values of the curvature radii of the lens surfaces on the object side and the image side of the negative lens Ln are so close that the value is larger than the upper limit of the conditional expression (2), fluctuation may increase in spherical aberration and coma caused by zooming.

The zoom lens according to each embodiment may satisfy a following conditional expression (3) where β2t represents a lateral magnification of the second lens unit L2 at the telephoto end and β2w represents a lateral magnification of the second lens unit L2 at the wide-angle end.

$$1.0 < \beta 2t/\beta 2w < 10.0 \quad (3)$$

The conditional expression (3) specifies a share of magnification variation of the second lens unit L2. If the share of magnification variation of the second lens unit L2 is so small that the value is smaller than the lower limit of the conditional expression (3), shares of magnification variation of the third and fourth lens units L3 and L4 increase, and fluctuation may increase in field curvature caused by zooming. If the share of aberration variation of the second lens unit L2 is so large that the value is larger than the upper limit of the conditional expression (3), fluctuation may increase in spherical aberration and coma caused by zooming.

The zoom lens according to each embodiment may satisfy a following conditional expression (4) where SKt represents a back focus at the telephoto end.

$$-1.0 < f2/SKt < 0.0 \quad (4)$$

The conditional expression (4) specifies the focal length and the back focus of the second lens unit L2. If the negative refractive power of the second lens unit L2 is so weak that the value is smaller than the lower limit of the conditional expression (4), the moving amount of each lens unit required for magnification variation increases, and the size of the zoom lens may increase. If the negative refractive power of the second lens unit L2 is so strong that the value is larger than the upper limit of the conditional expression (4), fluctuation may increase in spherical aberration and coma caused by zooming.

The zoom lens according to each embodiment may satisfy a following conditional expression (5) where f4 represents a focal length of the fourth lens unit L4.

$$0.0<f4/ft<3.5 \qquad (5)$$

The conditional expression (5) specifies the focal length of the fourth lens unit L4 and the focal length of the zoom lens at the telephoto end. If the positive refractive power of the fourth lens unit L4 is so strong that the value is smaller than the lower limit of the conditional expression (5), fluctuation may increase in field curvature caused by zooming. If the positive refractive power of the fourth lens unit L4 is so weak that the value is larger than the upper limit of the conditional expression (5), the moving amount of each lens unit required for magnification variation increases, and the size of the zoom lens may increase.

The zoom lens according to each embodiment may satisfy a following conditional expression (6) where f3 represents a focal length of the third lens unit L3.

$$0.0<f4/f3<13.0 \qquad (6)$$

The conditional expression (6) specifies the focal length of the third lens unit L3 and the focal length of the fourth lens unit L4. If the positive refractive power of the third lens unit L3 is so weak that the value is smaller than the lower limit of the conditional expression (6), the moving amount of each lens unit required for magnification variation increases, and the size of the zoom lens may increase. If the positive refractive power of the third lens unit L3 is so strong that the value is larger than the upper limit of the conditional expression (6), fluctuation may increase in spherical aberration and coma caused by zooming.

The zoom lens according to each embodiment may satisfy a following conditional expression (7) where f1 represents a focal length of the first lens unit L1.

$$0.2<f3/f1<1.7 \qquad (7)$$

The conditional expression (7) specifies the focal length of the first lens unit L1 and the focal length of the third lens unit L3. If the positive refractive power of the first lens unit L1 is so strong that the value is smaller than the lower limit of the conditional expression (7), fluctuation may increase in chromatic aberration caused by zooming. If the positive refractive power of the first lens unit L1 is so weak that the value is larger than the upper limit of the conditional expression (7), the moving amount of each lens unit required for magnification variation increases, and the size of the zoom lens may increase.

The zoom lens according to each embodiment may satisfy a following conditional expression (8).

$$-1.2<f2/f3<0.0 \qquad (8)$$

The conditional expression (8) specifies the focal length of the second lens unit L2 and the focal length of the third lens unit L3. If the positive refractive power of the third lens unit L3 is so strong that the value is smaller than the lower limit of the conditional expression (8), fluctuation may increase in spherical aberration and coma caused by zooming. If the positive refractive power of the third lens unit L3 is so weak that the value is larger than the upper limit of the conditional expression (8), the moving amount of each lens unit required for magnification variation increases, and the size of the zoom lens may increase.

The zoom lens according to each embodiment may satisfy a following conditional expression (9) where fw represents a focal length of the zoom lens at the wide-angle end.

$$2.0<ft/fw<5.0 \qquad (9)$$

The conditional expression (9) specifies the focal length of the zoom lens at the wide-angle end and telephoto end. If the value is smaller than the lower limit of the conditional expression (9), a magnification variation ratio by zooming may be small. If the value is larger than the upper limit of the conditional expression (9), the size of the zoom lens may increase.

The numerical ranges of the conditional expressions (2) to (9) may be set to numerical ranges of following conditional expressions (2a) to (9a), respectively.

$$-0.7<(R2n+R1n)/(R2n-R1n)<-0.3 \qquad (2a)$$

$$1.5\leq\beta2t/\beta2w<9.0 \qquad (3a)$$

$$-0.9<f2/SKt<-0.4 \qquad (4a)$$

$$0.1<f4/ft<3.0 \qquad (5a)$$

$$0.1<f4/f3<12.5 \qquad (6a)$$

$$0.25<f3/f1<1.00 \qquad (7a)$$

$$-1.15<f2/f3<-0.1 \qquad (8a)$$

$$3.0<ft/fw<4.5 \qquad (9a)$$

Further, the numerical ranges of the conditional expressions (2) to (9) may be set to numerical ranges of following conditional expressions (2b) to (9b), respectively.

$$-0.65<(R2n+R1n)/(R2n-R1n)<-0.40 \qquad (2b)$$

$$2.0<\beta2t/\beta2w<7.2 \qquad (3b)$$

$$-0.88<f2/SKt<-0.50 \qquad (4b)$$

$$0.14<f4/ft<2.90 \qquad (5b)$$

$$0.2<f4/f3<12.0 \qquad (6b)$$

$$0.3<f3/f1<0.8 \qquad (7b)$$

$$-1.1<f2/f3<-0.2 \qquad (8b)$$

$$3.3<ft/fw<4.3 \qquad (9b)$$

As with the zoom lens according to each of the second to fourth embodiments, the power configuration may be made closer to a telephoto type power configuration by disposing a fifth lens unit having a negative refractive power.

As with the zoom lens according to each of the first, fifth, and seventh embodiments, the power configuration may be made closer to a telephoto type power configuration by disposing a fifth lens unit having a negative refractive power and a sixth lens unit having a negative refractive power.

In the zoom lens according to each embodiment, focusing is performed by moving part of the fourth lens unit L4 or the fifth lens unit to the image side, but focusing may be performed by the other lens unit.

Numerical examples 1 to 7 will be given which correspond to the first to seventh embodiments, respectively.

In surface data of each numerical example, r represents a curvature radius of each optical surface, and d (mm) represents an on-axis distance, that is a distance on an optical axis, between an m-th surface and an (m+1)-th surface. m is the number of the surface counted from a light-entering side.

nd represents a refractive index of each optical member for the d-line, and vd represents an Abbe number of each optical member. An Abbe number vd of certain material is defined by a following expression where Nd, NF, and NC represent refractive indexes for the d-line (587.6 nm), F-line (486.1 nm), and C-line (656.3 nm) of the Fraunhofer lines.

$$vd=(Nd-1)/(NF-NC)$$

In each numerical example, all of the values of d, focal length (mm). F-number, and half angle of view (degrees) are values when the zoom lens according to each embodiment focuses on an object at infinity. "back focus" is an air conversion length of a distance on the optical axis from a last lens surface, that is a lens surface of a most image side, to a paraxial image plane. "total lens length" is a length obtained by adding the back focus to a distance on the optical axis from a front surface, that is a lens surface of a most object side, to the last surface of the zoom lens. "lens unit" is not limited to consist of a plurality of lenses, but may consist of a single lens.

When an optical surface is an aspherical surface, * sign is attached to a right side of a surface number. For an aspherical shape, a following expression is satisfied where X represents a displacement amount from a surface vertex in the optical axis direction, h represents a height from the optical axis in a direction orthogonal to the optical axis, R represents a paraxial curvature radius, K represents a conic constant, and each of A4, A6 and A8 represents an optical surface coefficient of each order.

$$X=(h^2/R)/[1+\{1-(1+K)(h/R)^2\}^{1/2}+A4 \times h^4+A6 \times h^5+A8 \times h^8$$

"e±XX" in each aspherical surface coefficient represents "×10±$^{XX}$".

Numerical Example 1

| Unit mm | | | | | |
|---|---|---|---|---|---|
| Surface data | | | | | |
| Surface Number | r | d | nd | vd | Effective Diameter |
| 1 | 111.282 | 4.89 | 1.48749 | 70.2 | 54.72 |
| 2 | 4709.206 | 0.20 | | | 54.46 |
| 3 | 134.167 | 2.50 | 1.74320 | 49.3 | 53.78 |
| 4 | 61.569 | 6.64 | 1.49700 | 81.5 | 52.05 |
| 5 | 403.791 | (variable) | | | 51.68 |
| 6 | −126.378 | 1.30 | 1.80400 | 46.5 | 24.55 |
| 7 | 29.248 | 3.36 | 2.00100 | 29.1 | 24.30 |
| 8 | 61.656 | (variable) | | | 24.04 |
| 9 | 380.145 | 2.24 | 1.89190 | 37.1 | 24.29 |
| 10 | 38.497 | 4.20 | 1.59282 | 68.6 | 24.43 |
| 11 | −145.198 | 0.20 | | | 24.76 |
| 12 | 51.967 | 2.62 | 1.72825 | 28.5 | 25.33 |
| 13 | 203.620 | 2.39 | | | 25.23 |
| 14 (diaphragm) | ∞ | (variable) | | | 25.17 |
| 15 | 1813.855 | 1.30 | 2.00100 | 29.1 | 26.51 |
| 16 | 56.675 | 4.92 | 1.48749 | 70.2 | 26.95 |
| 17 | −62.454 | 0.20 | | | 27.64 |
| 18 | 62.951 | 3.71 | 1.73400 | 51.5 | 28.87 |
| 19 | −210.367 | (variable) | | | 28.87 |
| 20 | 357.436 | 1.30 | 1.49700 | 81.5 | 25.82 |
| 21 | 42.882 | (variable) | | | 25.55 |
| 22 | 246.554 | 6.00 | 1.80809 | 22.8 | 26.97 |
| 23 | −84.837 | 1.63 | 1.71300 | 53.9 | 27.19 |
| 24 | 56.300 | (variable) | | | 27.33 |
| image plane | ∞ | | | | |

| Unit mm | | | |
|---|---|---|---|
| VARIOUS DATA Zoom ratio 3.77 | | | |
| | Wide angle | Middle | Telephoto |
| Focal length | 103.00 | 200.00 | 388.50 |
| F-number | 5.00 | 6.26 | 7.10 |
| Half angle of view (degree) | 11.86 | 6.17 | 3.19 |
| Image height | 21.64 | 21.64 | 21.64 |
| Lens total length | 215.58 | 255.38 | 293.58 |
| BF | 38.40 | 58.61 | 78.01 |
| d 5 | 5.50 | 57.13 | 106.68 |
| d 8 | 26.20 | 14.37 | 3.01 |
| d14 | 56.54 | 36.33 | 16.93 |
| d19 | 29.72 | 18.99 | 2.00 |
| d21 | 9.63 | 20.36 | 37.35 |
| d24 | 38.40 | 58.61 | 78.01 |
| Position of entrance pupil | 49.19 | 146.26 | 331.21 |
| Exit pupil position | −55.26 | −48.12 | −43.29 |
| Front principal point position | 38.91 | −28.51 | −524.57 |
| Rear principal point position | −64.60 | −141.39 | −310.49 |

| ZOOM LENS UNIT DATA | | | | | |
|---|---|---|---|---|---|
| Unit | Starting surface | Focal length | Lens structure length | Front principal point position | Rear principal point position |
| 1 | 1 | 213.28 | 14.22 | −2.58 | −11.76 |
| 2 | 6 | −62.92 | 4.66 | 2.14 | −0.25 |
| 3 | 9 | 106.86 | 11.65 | 4.66 | −3.23 |
| 4 | 15 | 66.65 | 10.13 | 6.35 | 0.22 |
| 5 | 20 | −98.18 | 1.30 | 0.99 | 0.12 |
| 6 | 22 | −123.65 | 7.63 | 6.22 | 1.86 |

Numerical Example 2

| Unit mm | | | | | |
|---|---|---|---|---|---|
| Surface data | | | | | |
| Surface Number | r | d | nd | vd | Effective Diameter |
| 1 | 77.669 | 5.79 | 1.48749 | 70.2 | 54.72 |
| 2 | 463.451 | 7.39 | | | 54.33 |
| 3 | 100.246 | 2.40 | 1.80400 | 46.5 | 51.30 |
| 4 | 46.951 | 7.86 | 1.49700 | 81.5 | 48.90 |
| 5 | 351.536 | (variable) | | | 48.45 |
| 6 | −112.275 | 1.28 | 1.73400 | 51.5 | 23.20 |
| 7 | 24.869 | 3.02 | 1.90366 | 31.3 | 22.81 |
| 8 | 52.139 | (variable) | | | 22.56 |
| 9 | −182.780 | 1.29 | 1.91082 | 35.3 | 22.81 |
| 10 | 34.150 | 4.91 | 1.49700 | 81.5 | 23.38 |
| 11 | −73.207 | 0.19 | | | 24.16 |
| 12 | 43.583 | 3.52 | 1.76182 | 26.5 | 25.60 |
| 13 | −1301.014 | 1.97 | | | 25.58 |
| 14 (diaphragm) | ∞ | (variable) | | | 25.48 |
| 15 | −81.734 | 1.20 | 1.80000 | 29.8 | 24.20 |
| 16 | 46.530 | 6.81 | 1.51823 | 58.9 | 24.60 |
| 17 | −38.903 | 0.19 | | | 25.31 |
| 18 | 62.953 | 3.06 | 1.77250 | 49.6 | 25.31 |
| 19 | −283.794 | (variable) | | | 25.04 |
| 20 | −131.110 | 1.30 | 1.48749 | 70.2 | 22.57 |
| 21 | 54.266 | 4.45 | | | 22.72 |
| 22 | 1243.863 | 2.72 | 1.75520 | 27.5 | 23.67 |
| 23 | −60.113 | 10.02 | | | 23.90 |
| 24 | −59.709 | 1.30 | 1.80400 | 46.5 | 23.56 |
| 25 | 155.743 | (variable) | | | 24.03 |
| image plane | ∞ | | | | |

| Unit mm | | | |
|---|---|---|---|
| VARIOUS DATA Zoom ratio 3.77 | | | |
| | Wide angle | Middle | Telephoto |
| Focal length | 103.01 | 200.00 | 388.50 |
| F-number | 5.00 | 6.45 | 7.10 |
| Half angle of view (degree) | 11.86 | 6.17 | 3.19 |
| Image height | 21.64 | 21.64 | 21.64 |
| Lens total length | 207.99 | 243.96 | 285.99 |
| BF | 45.82 | 78.95 | 112.66 |
| d 5 | 6.47 | 42.44 | 84.47 |
| d 8 | 30.69 | 16.51 | 4.60 |
| d14 | 28.18 | 17.62 | 11.27 |
| d19 | 26.16 | 17.76 | 2.32 |
| d25 | 45.82 | 78.95 | 112.66 |
| Position of entrance pupil | 70.66 | 148.01 | 330.75 |
| Exit pupil position | −41.53 | −35.09 | −27.58 |
| Front principal point position | 52.20 | −2.74 | −356.95 |
| Rear principal point position | −57.19 | −121.05 | −275.83 |

| ZOOM LENS UNIT DATA | | | | |
|---|---|---|---|---|
| Unit | Starting surface | Focal length | Lens structure length | Front principal point position | Rear principal point position |
|---|---|---|---|---|---|
| 1 | 1 | 181.86 | 23.45 | −3.71 | −21.04 |
| 2 | 6 | −58.52 | 4.30 | 2.05 | −0.25 |
| 3 | 9 | 108.48 | 11.88 | 10.33 | 2.83 |
| 4 | 15 | 68.57 | 11.26 | 10.23 | 3.97 |
| 5 | 20 | −54.34 | 19.78 | 12.06 | −3.98 |

Numerical Example 3

| Unit mm | | | | | |
|---|---|---|---|---|---|
| Surface data | | | | | |
| Surface Number | r | d | nd | vd | Effective Diameter |
|---|---|---|---|---|---|
| 1 | 91.313 | 2.20 | 1.85150 | 40.8 | 47.15 |
| 2 | 59.400 | 0.20 | | | 46.22 |
| 3 | 58.750 | 7.68 | 1.49700 | 81.5 | 46.30 |
| 4 | −311.050 | (variable) | | | 46.07 |
| 5 | −91.242 | 1.17 | 1.72916 | 54.7 | 24.84 |
| 6 | 30.792 | 2.91 | 1.90366 | 31.3 | 24.74 |
| 7 | 72.188 | (variable) | | | 24.61 |
| 8 | 48.060 | 5.56 | 1.49700 | 81.5 | 24.90 |
| 9 | −37.205 | 1.93 | | | 24.73 |
| 10 | −34.091 | 1.17 | 1.80400 | 46.5 | 23.71 |
| 11 | −76.576 | 6.66 | | | 23.85 |
| 12 (diaphragm) | ∞ | (variable) | | | 22.72 |
| 13 | −483.942 | 1.19 | 1.90366 | 31.3 | 22.01 |
| 14 | 39.404 | 4.99 | 1.51823 | 58.9 | 22.52 |
| 15 | −46.069 | 0.21 | | | 23.24 |
| 16 | 41.211 | 3.06 | 1.62004 | 36.3 | 24.36 |
| 17 | 278.576 | (variable) | | | 24.28 |
| 18 | −83.154 | 2.04 | 1.84666 | 23.8 | 23.74 |
| 19 | −47.929 | 4.20 | | | 23.91 |
| 20 | −47.194 | 1.18 | 1.59282 | 68.6 | 22.96 |
| 21 | 36.699 | (variable) | | | 23.19 |
| image plane | ∞ | | | | |

| VARIOUS DATA Zoom ratio 3.77 | | | |
|---|---|---|---|
| | Wide angle | Middle | Telephoto |
| Focal length | 103.00 | 200.00 | 388.48 |
| F-number | 5.18 | 6.70 | 8.24 |
| Half angle of view (degree) | 11.86 | 6.17 | 3.19 |
| Image height | 21.64 | 21.64 | 21.64 |
| Lens total length | 203.50 | 243.44 | 273.50 |
| BF | 41.10 | 76.59 | 114.00 |
| d 4 | 18.23 | 58.18 | 88.23 |
| d 7 | 42.44 | 28.95 | 1.76 |
| d12 | 32.34 | 18.85 | 16.69 |
| d17 | 23.03 | 14.52 | 6.46 |
| d21 | 41.10 | 76.59 | 114.00 |
| Position of entrance pupil | 80.46 | 174.49 | 247.29 |
| Exit pupil position | −33.00 | −25.90 | −22.93 |
| Front principal point position | 40.28 | −15.81 | −466.39 |
| Rear principal point position | −61.90 | −123.41 | −274.48 |

| ZOOM LENS UNIT DATA | | | | | |
|---|---|---|---|---|---|
| Unit | Starting surface | Focal length | Lens structure length | Front principal point position | Rear principal point position |
|---|---|---|---|---|---|
| 1 | 1 | 197.01 | 10.09 | 1.02 | −5.56 |
| 2 | 5 | −67.01 | 4.08 | 1.59 | −0.60 |
| 3 | 8 | 89.45 | 15.31 | −1.39 | −14.18 |
| 4 | 13 | 74.49 | 9.45 | 6.50 | 0.73 |
| 5 | 18 | −48.82 | 7.42 | 6.98 | 0.86 |

Numerical Example 4

| Unit mm | | | | | |
|---|---|---|---|---|---|
| Surface data | | | | | |
| Surface Number | r | d | nd | vd | Effective Diameter |
|---|---|---|---|---|---|
| 1 | 54.161 | 4.01 | 1.48749 | 70.2 | 34.15 |
| 2 | 517.689 | 0.19 | | | 33.83 |
| 3 | 68.798 | 1.59 | 1.80400 | 46.5 | 33.26 |
| 4 | 33.441 | 5.00 | 1.49700 | 81.5 | 31.89 |
| 5 | 187.847 | (variable) | | | 31.49 |
| 6 | −76.370 | 1.27 | 1.73400 | 51.5 | 14.60 |
| 7 | 17.449 | 2.25 | 1.90366 | 31.3 | 14.35 |
| 8 | 36.974 | (variable) | | | 14.13 |
| 9 | −224.390 | 1.28 | 1.91082 | 35.3 | 14.32 |
| 10 | 22.509 | 3.27 | 1.49700 | 81.5 | 14.48 |
| 11 | −57.451 | 0.18 | | | 14.92 |
| 12 | 29.278 | 2.44 | 1.76182 | 26.5 | 15.40 |
| 13 | 4256.814 | 1.99 | | | 15.28 |
| 14 (diaphragm) | ∞ | (variable) | | | 15.01 |
| 15 | −57.385 | 0.88 | 1.80000 | 29.8 | 16.76 |
| 16 | 31.316 | 4.67 | 1.51823 | 58.9 | 17.66 |
| 17 | −27.281 | 0.19 | | | 18.57 |
| 18 | 42.756 | 3.05 | 1.77250 | 49.6 | 19.79 |
| 19 | −140.236 | (variable) | | | 19.81 |
| 20 | −217.902 | 1.29 | 1.48749 | 70.2 | 18.07 |
| 21 | 35.049 | 3.24 | | | 17.99 |
| 22 | −12421.334 | 2.74 | 1.75520 | 27.5 | 18.44 |
| 23 | −34.005 | 3.87 | | | 18.62 |
| 24 | −28.087 | 1.30 | 1.80400 | 46.5 | 17.82 |
| 25 | 108.247 | (variable) | | | 18.39 |
| image plane | ∞ | | | | |

| VARIOUS DATA Zoom ratio 4.28 | | | |
|---|---|---|---|
| | Wide angle | Middle | Telephoto |
| Focal length | 56.66 | 120.00 | 242.50 |
| F-number | 4.66 | 6.45 | 7.10 |
| Half angle of view (degree) | 13.55 | 6.49 | 3.22 |
| Image height | 13.66 | 13.66 | 13.66 |
| Lens total length | 129.73 | 155.54 | 184.73 |

-continued

| Unit mm | | | |
|---|---|---|---|
| BF | 19.19 | 43.59 | 64.21 |
| d 5 | 5.29 | 31.10 | 60.29 |
| d 8 | 20.11 | 11.35 | 3.78 |
| d14 | 20.52 | 12.46 | 9.77 |
| d19 | 19.93 | 12.35 | 1.99 |
| d25 | 19.19 | 43.59 | 64.21 |
| Position of entrance pupil | 41.77 | 96.67 | 228.56 |
| Exit pupil position | −26.97 | −22.48 | −19.04 |
| Front principal point position | 28.88 | −1.28 | −235.32 |
| Rear principal point position | −37.47 | −76.41 | −178.29 |

ZOOM LENS UNIT DATA

| Unit | Starting surface | Focal length | Lens structure length | Front principal point position | Rear principal point position |
|---|---|---|---|---|---|
| 1 | 1 | 121.32 | 10.79 | −2.65 | −9.54 |
| 2 | 6 | −40.94 | 3.52 | 1.61 | −0.28 |
| 3 | 9 | 72.19 | 9.16 | 6.60 | 0.52 |
| 4 | 15 | 44.01 | 8.79 | 7.06 | 2.15 |
| 5 | 20 | −33.09 | 12.44 | 7.32 | −2.17 |

Numerical Example 5

| Unit mm | | | | | |
|---|---|---|---|---|---|
| Surface data | | | | | |
| Surface Number | r | d | nd | vd | Effective Diameter |
| 1 | 56.985 | 1.65 | 1.83481 | 42.7 | 34.15 |
| 2 | 39.045 | 5.95 | 1.49700 | 81.5 | 33.37 |
| 3 | −279.156 | (variable) | | | 33.13 |
| 4 | −76.959 | 0.99 | 1.80400 | 46.5 | 17.50 |
| 5 | 18.668 | 2.91 | 1.90366 | 31.3 | 17.33 |
| 6 | 53.245 | (variable) | | | 17.19 |
| 7 | 109.956 | 1.00 | 2.00100 | 29.1 | 17.48 |
| 8 | 24.844 | 3.71 | 1.48749 | 70.2 | 17.43 |
| 9 | −123.942 | 0.19 | | | 17.85 |
| 10 | 32.736 | 2.73 | 1.80518 | 25.4 | 18.36 |
| 11 | 1295.532 | 7.07 | | | 18.20 |
| 12 (diaphragm) | ∞ | (variable) | | | 16.86 |
| 13 | 129.135 | 1.00 | 2.00069 | 25.5 | 17.32 |
| 14 | 27.579 | 4.70 | 1.51823 | 58.9 | 17.47 |
| 15 | −33.552 | 0.20 | | | 18.12 |
| 16 | 29.417 | 2.67 | 1.58913 | 61.1 | 18.70 |
| 17 | 150.654 | (variable) | | | 18.52 |
| 18 | 51.890 | 1.00 | 1.61800 | 63.4 | 16.76 |
| 19 | 19.334 | (variable) | | | 16.33 |
| 20 | −34.679 | 1.00 | 1.67790 | 55.3 | 17.54 |
| 21 | 27.642 | 8.66 | 1.84666 | 23.8 | 18.90 |
| 22 | 311.069 | (variable) | | | 20.70 |
| image plane | ∞ | | | | |

VARIOUS DATA
Zoom ratio 4.28

| | Wide angle | Middle | Telephoto |
|---|---|---|---|
| Focal length | 56.67 | 105.86 | 242.49 |
| F-number | 4.31 | 5.34 | 7.10 |
| Half angle of view (degree) | 13.55 | 7.35 | 3.22 |
| Image height | 13.66 | 13.66 | 13.66 |
| Lens total length | 129.63 | 159.61 | 184.63 |
| BF | 13.85 | 27.67 | 51.61 |
| d 3 | 3.01 | 32.98 | 58.01 |
| d 6 | 26.07 | 20.47 | 2.97 |
| d12 | 20.20 | 15.18 | 11.48 |
| d17 | 13.25 | 8.34 | 1.49 |
| d19 | 7.84 | 9.56 | 13.67 |

-continued

| Unit mm | | | |
|---|---|---|---|
| d22 | 13.85 | 27.67 | 51.61 |
| Position of entrance pupil | 39.68 | 107.95 | 188.71 |
| Exit pupil position | −27.94 | −26.40 | −25.67 |
| Front principal point position | 19.52 | 6.54 | −329.72 |
| Rear principal point position | −42.81 | −78.19 | −190.88 |

ZOOM LENS UNIT DATA

| Unit | Starting surface | Focal length | Lens structure length | Front principal point position | Rear principal point position |
|---|---|---|---|---|---|
| 1 | 1 | 127.79 | 7.60 | 0.12 | −4.79 |
| 2 | 4 | −44.89 | 3.90 | 1.45 | −0.61 |
| 3 | 7 | 58.28 | 14.70 | 4.53 | −7.15 |
| 4 | 13 | 43.74 | 8.56 | 4.50 | −0.87 |
| 5 | 18 | −50.45 | 1.00 | 0.99 | 0.37 |
| 6 | 20 | −61.37 | 9.66 | 0.66 | −4.56 |

Numerical Example 6

| Unit mm | | | | | |
|---|---|---|---|---|---|
| Surface data | | | | | |
| Surface Number | r | d | nd | vd | Effective Diameter |
| 1 | 70.899 | 2.00 | 1.89190 | 37.1 | 42.47 |
| 2 | 54.867 | 8.15 | 1.49700 | 81.5 | 41.64 |
| 3 | 268.615 | (variable) | | | 40.88 |
| 4 | −82.783 | 1.18 | 1.80400 | 46.5 | 24.61 |
| 5 | 34.353 | 0.37 | | | 24.81 |
| 6 | 35.394 | 2.78 | 2.00069 | 25.5 | 25.09 |
| 7 | 89.376 | (variable) | | | 25.06 |
| 8 | 65.716 | 3.88 | 1.48749 | 70.2 | 25.59 |
| 9 | −78.400 | 0.15 | | | 25.63 |
| 10 | 35.993 | 5.75 | 1.48749 | 70.2 | 25.19 |
| 11 | −48.034 | 1.20 | 1.90525 | 35.0 | 24.58 |
| 12 | 107.202 | 4.22 | | | 24.13 |
| 13 (diaphragm) | ∞ | (variable) | | | 23.97 |
| 14 | 52.410 | 1.20 | 1.85150 | 40.8 | 23.60 |
| 15 | 28.281 | 5.71 | 1.53172 | 48.8 | 23.06 |
| 16 | −50.911 | 15.01 | | | 22.86 |
| 17 | 77.821 | 1.60 | 1.84666 | 23.8 | 19.70 |
| 18 | 133.090 | 3.06 | | | 19.50 |
| 19 | −67.742 | 2.25 | 1.71736 | 29.5 | 19.21 |
| 20 | −31.675 | 0.97 | | | 19.26 |
| 21 | −35.495 | 1.19 | 1.77250 | 49.6 | 18.76 |
| 22 | −277.702 | 6.23 | | | 18.79 |
| 23 | −24.949 | 1.20 | 1.77250 | 49.6 | 18.67 |
| 24 | −145.477 | (variable) | | | 19.56 |
| image plane | | | | | |

VARIOUS DATA
Zoom ratio 3.50

| | Wide angle | Middle | Telephoto |
|---|---|---|---|
| Focal length | 100.00 | 160.00 | 349.99 |
| F-number | 5.55 | 6.60 | 8.24 |
| Half angle of view (degree) | 12.21 | 7.70 | 3.54 |
| Image height | 21.64 | 21.64 | 21.64 |
| Lens total length | 173.51 | 209.43 | 263.88 |
| BF | 48.38 | 62.56 | 84.06 |
| d 3 | 6.48 | 44.75 | 102.77 |
| d 7 | 40.50 | 26.50 | 1.91 |
| d13 | 10.05 | 7.52 | 7.05 |
| d24 | 48.38 | 62.56 | 84.06 |
| Position of entrance pupil | 53.94 | 113.42 | 241.93 |

-continued

Unit mm

| | | | |
|---|---|---|---|
| Exit pupil position | −20.85 | −20.09 | −19.95 |
| Front principal point position | 9.50 | −36.31 | −585.82 |
| Rear principal point position | −51.62 | −97.44 | −265.94 |

ZOOM LENS UNIT DATA

| Unit | Starting surface | Focal length | Lens structure length | Front principal point position | Rear principal point position |
|---|---|---|---|---|---|
| 1 | 1 | 269.69 | 10.15 | −5.32 | −11.64 |
| 2 | 4 | −62.73 | 4.33 | 0.82 | −1.56 |
| 3 | 8 | 84.25 | 15.20 | −5.20 | −15.75 |
| 4 | 14 | 1000.77 | 38.42 | −836.51 | −473.50 |

Numerical Example 7

Unit mm

Surface data

| Surface Number | r | d | nd | vd | Effective Diameter |
|---|---|---|---|---|---|
| 1 | 90.278 | 2.21 | 1.83400 | 37.2 | 47.15 |
| 2 | 60.254 | 7.53 | 1.49700 | 81.5 | 46.25 |
| 3 | −315.072 | (variable) | | | 46.01 |
| 4 | −100.246 | 1.20 | 1.72916 | 54.7 | 24.86 |
| 5 | 30.087 | 0.09 | | | 24.70 |
| 6 | 30.234 | 2.96 | 1.90366 | 31.3 | 24.76 |
| 7 | 70.606 | (variable) | | | 24.60 |
| 8 | 34.152 | 5.57 | 1.48749 | 70.2 | 24.94 |
| 9 | −55.107 | 0.19 | | | 24.60 |
| 10 | 42.435 | 2.98 | 1.56883 | 56.4 | 22.94 |
| 11 | 648.789 | 1.29 | | | 22.13 |
| 12 | −60.449 | 1.50 | 1.83400 | 37.2 | 21.97 |
| 13 | 86.353 | 3.89 | | | 21.16 |
| 14 (diaphragm) | ∞ | (variable) | | | 20.32 |
| 15 | 43.048 | 1.46 | 2.00100 | 29.1 | 18.40 |
| 16 | 26.165 | 5.88 | | | 17.70 |
| 17 | 40.924 | 3.55 | 1.57099 | 50.8 | 19.29 |
| 18 | −59.762 | (variable) | | | 19.31 |
| 19 | −155.948 | 2.07 | 1.84666 | 23.8 | 18.89 |
| 20 | −46.076 | 1.06 | | | 18.85 |
| 21 | −47.036 | 1.20 | 1.72916 | 54.7 | 18.36 |
| 22 | 49.263 | (variable) | | | 18.14 |
| 23* | −53.987 | 1.42 | 1.53110 | 55.9 | 21.57 |
| 24* | −88.772 | (variable) | | | 22.04 |
| image plane | ∞ | | | | |

ASPHERICAL SURFACE DATA

Twenty-third surface

K = 0.00000e+000 A 4 = −2.02738e−005 A 6 = 1.15136e−007 A 8 = −1.58449e−010

Twenty-fourth surface

K = 0.00000e+000 A 4 = −1.75544e−005 A 6 = 1.08061e−007 A 8 = −1.59945e−010

VARIOUS DATA
Zoom ratio 3.77

| | Wide angle | Middle | Telephoto |
|---|---|---|---|
| Focal length | 103.01 | 200.00 | 388.49 |
| F-number | 5.66 | 6.74 | 8.24 |
| Half angle of view (degree) | 11.86 | 6.17 | 3.19 |
| Image height | 21.64 | 21.64 | 21.64 |
| Lens total length | 173.65 | 224.30 | 254.89 |
| BF | 38.75 | 57.75 | 88.07 |
| d 3 | 3.83 | 54.48 | 85.07 |
| d 7 | 43.74 | 29.71 | 1.96 |
| d14 | 13.89 | 8.93 | 6.36 |
| d18 | 19.04 | 11.26 | 2.00 |
| d22 | 8.35 | 16.13 | 25.39 |
| d24 | 38.75 | 57.75 | 88.07 |
| Position of entrance pupil | 56.69 | 169.08 | 243.78 |
| Exit pupil position | −33.47 | −35.40 | −38.07 |
| Front principal point position | 12.79 | −60.33 | −564.23 |
| Rear principal point position | −64.25 | −142.25 | −300.42 |

ZOOM LENS UNIT DATA

| Unit | Starting surface | Focal length | Lens structure length | Front principal point position | Rear principal point position |
|---|---|---|---|---|---|
| 1 | 1 | 190.92 | 9.74 | 0.60 | −5.69 |
| 2 | 4 | −69.27 | 4.24 | 1.61 | −0.70 |
| 3 | 8 | 65.75 | 15.42 | −5.78 | −16.26 |
| 4 | 15 | 93.23 | 10.90 | 14.13 | 6.18 |
| 5 | 19 | −58.70 | 4.32 | 3.24 | 0.36 |
| 6 | 23 | −263.15 | 1.42 | −1.46 | −2.41 |

The various values in each numerical example are summarized in Table 1 below.

TABLE 1

| | (1) | (2) | (3) | (4) | (5) | (6) | (7) | (8) | (9) |
|---|---|---|---|---|---|---|---|---|---|
| Example 1 | −0.16 | −0.62 | 4.40 | −0.81 | 0.17 | 0.62 | 0.50 | −0.59 | 3.77 |
| Example 2 | −0.15 | −0.64 | 5.94 | −0.52 | 0.18 | 0.63 | 0.60 | −0.54 | 3.77 |
| Example 3 | −0.17 | −0.50 | 3.02 | −0.59 | 0.19 | 0.83 | 0.45 | −0.75 | 3.77 |
| Example 4 | −0.17 | −0.63 | 7.15 | −0.64 | 0.18 | 0.61 | 0.60 | −0.57 | 4.28 |
| Example 5 | −0.19 | −0.61 | 3.95 | −0.87 | 0.18 | 0.75 | 0.46 | −0.77 | 4.28 |
| Example 6 | −0.18 | −0.41 | 2.05 | −0.75 | 2.86 | 11.88 | 0.31 | −0.74 | 3.50 |
| Example 7 | −0.18 | −0.54 | 3.77 | −0.79 | 0.24 | 1.42 | 0.34 | −1.05 | 3.77 |

Image Pickup Apparatus

Figure 15:
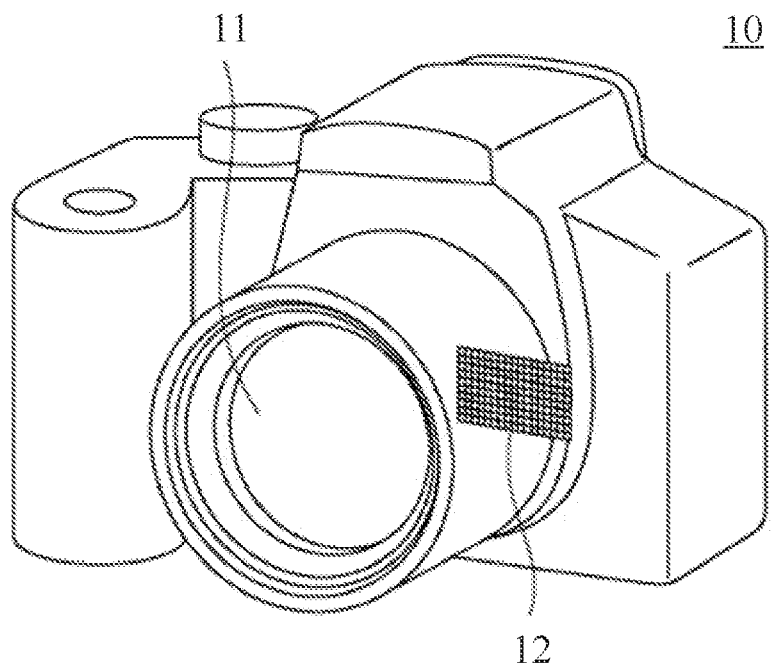
FIG. 15 is a schematic view illustrating an image pickup apparatus.

Next, an embodiment will be described in which a digital still camera as an image pickup apparatus uses the optical system according to the present invention as an image pickup optical system, with reference to FIG. 15. In FIG. 15, a reference numeral 10 denotes a camera body, and a reference numeral 11 denotes an image pickup optical system configured by any of the zoom lenses described in the first to seventh embodiments. A reference numeral 12 denotes a solid-state image sensor as a photoelectric conversion element, such as a CCD sensor or a CMOS sensor. The solid-state image sensor 12 is built in the camera body and is configured to receive light of an optical image formed by the image pickup optical system 11 and to perform photoelectric conversion. The camera body 10 may be a so-called single-lens reflex camera having a quick turn mirror, or may be a so-called mirrorless camera having no quick turn mirror.

By applying the zoom lens according to the present invention to an image pickup apparatus such as a digital still camera, an image pickup apparatus having a small lens can be obtained.

Image Pickup System

An image pickup system (surveillance camera system) may be configured which includes the zoom lens according to each embodiment and a controlling unit configured to control the zoom lens. In this case, the controlling unit can control the zoom lens so that each lens unit moves as described above during zooming, focusing, and image stabilization. The controlling unit may not be necessarily integrally configured with the zoom lens, and the controlling unit may be configured as a separate body from the zoom lens. For example, the controlling unit (control apparatus) may be disposed far away from a driving unit configured to drive each lens of the zoom lens and may include a transmitting unit configured to transmit a control signal (command) for controlling the zoom lens. According to such a controlling unit, the zoom lens can be remotely controlled.

By providing an operating unit such as a controller or a button for remotely controlling the zoom lens on the controlling unit, the zoom lens may be controlled according to input to the operating unit by the user. For example, an enlargement button and a reduction button may be provided as operating units, and the controlling unit may transmit a signal to the driving unit of the zoom lens so that magnification variation of the zoom lens increases when the user presses the enlargement button, and the magnification variation of the zoom lens decreases when the user presses the reduction button.

The image pickup system may include a display such as a liquid crystal panel configured to display information on zooming (moving state) of the zoom lens. The information on zooming of the zoom lens is, for example, a zoom magnification variation (zooming state) and a moving amount (moving state) of each lens unit. In this case, the user can remotely operate the zoom lens via the operating unit while viewing the information on zooming of the zoom lens displayed on the display. The display and the operating unit may be integrated by using, for example, a touch panel.

According to the above-described embodiments, it is possible to provide a zoom lens that has high optical performance over an entire zoom range while having a small size and a reduced weight, and an image pickup apparatus and an image pickup system having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-010541, filed on Jan. 27, 2020 which is hereby incorporated by reference herein in its entirety. The scope of the following claims is to be accorded the broadest interpretation so as to encompass all such modifications and equivalent structures and functions.

What is claimed is:

1. A zoom lens including, in order from object side to image side, a first lens unit having a positive refractive power, a second lens unit having a negative refractive power, a third lens unit having a positive refractive power, and a fourth lens unit having a positive refractive power, wherein, during zooming from a wide-angle end to a telephoto end, the first lens unit is arranged to move, the distance between the first lens unit and the second lens unit increases, the distance between the second lens unit and the third lens unit decreases, and the distance between the third lens unit and the fourth lens unit decreases, wherein the second lens unit consists of a first lens having a negative refractive power and a second lens having a positive refractive power, the second lens being disposed on the image side of the first lens, and wherein a following conditional expression is satisfied:

$$-0.3 < f2/ft < 0.0; \text{ and}$$

$$-1.0 < (R2n+R1n)/(R2n-R1n) < -0.2$$

where f2 represents a focal length of the second lens unit, ft represents a focal length of the zoom lens at the telephoto end, R1n represents a curvature radius of a lens surface on the object side of the first lens, and R2n represents a curvature radius of a lens surface on the image side of the first lens.

2. The zoom lens according to claim 1, wherein a following conditional expression is satisfied:

$$1.0 < \beta 2t/\beta 2w < 10.0$$

where $\beta 2t$ represents a lateral magnification of the second lens unit at the telephoto end and $\beta 2w$ represents a lateral magnification of the second lens unit at the wide-angle end.

3. The zoom lens according to claim 1, wherein a following conditional expression is satisfied:

$$-1.0 < f2/SKt < 0.0$$

where SKt represents a back focus at the telephoto end.

4. The zoom lens according to claim 1, wherein a following conditional expression is satisfied:

$$0.0 < f4/ft < 3.5$$

where f4 represents a focal length of the fourth lens unit.

5. The zoom lens according to claim 1, wherein a following conditional expression is satisfied:

$$0.0 < f4/f3 < 13.0$$

where f3 represents a focal length of the third lens unit and f4 represents a focal length of the fourth lens unit.

6. The zoom lens according to claim 1, wherein a following conditional expression is satisfied:

$$0.2 < f3/f1 < 1.7$$

where f1 represents a focal length of the first lens unit and f3 represents a focal length of the third lens unit.

7. The zoom lens according to claim 1,
wherein a following conditional expression is satisfied:

$-1.2 < f2/f3 < 0.0$ where f3 represents a focal length of the third lens unit.

8. The zoom lens according to claim 1,
wherein a following conditional expression is satisfied:

$2.0 < ft/fw < 5.0$ where fw represents a focal length of the zoom lens at the wide-angle end.

9. The zoom lens according to claim 1 further comprising, a fifth lens unit, having a negative refractive power, located nearer to the image side than the first to fourth lens units.

10. The zoom lens according to claim 9 further comprising, a sixth lens unit, having a negative refractive power, located nearer to the image side than the first to fifth lens units.

11. An image pickup apparatus comprising:
a zoom lens; and
an image sensor configured to receive light of an image formed by the zoom lens,
wherein the zoom lens includes, in order from object side to image side, a first lens unit having a positive refractive power, a second lens unit having a negative refractive power, a third lens unit having a positive refractive power, and a fourth lens unit having a positive refractive power,
wherein, during zooming from a wide-angle end to a telephoto end, the first lens unit is arranged to move, the distance between the first lens unit and the second lens unit increases, the distance between the second lens unit and the third lens unit decreases, and the distance between the third lens unit and the fourth lens unit decreases,
wherein the second lens unit consists of a first lens having a negative refractive power and a second lens having a positive refractive power, the second lens being disposed on the image side of the first lens, and
wherein a following conditional expression is satisfied:

$-0.3 < f2/ft < 0.0$; and $-1.0 < (R2n+R1n)/(R2n-R1n) < -0.2$ where f2 represents a focal length of the second lens unit, ft represents a focal length of the zoom lens at the telephoto end, R1n represents a curvature radius of a lens surface on the object side of the first lens, and R2n represents a curvature radius of a lens surface on the image side of the first lens.

12. An image pickup system comprising:
a zoom lens; and
a controlling unit configured to control the zoom lens during zooming, wherein the zoom lens includes, in order from object side to image side, a first lens unit having a positive refractive power, a second lens unit having a negative refractive power, a third lens unit having a positive refractive power, and a fourth lens unit having a positive refractive power,
wherein, during zooming from a wide-angle end to a telephoto end, the first lens unit is arranged to move, the distance between the first lens unit and the second lens unit increases, the distance between the second lens unit and the third lens unit decreases, and the distance between the third lens unit and the fourth lens unit decreases,
wherein the second lens unit consists of a first lens having a negative refractive power and a second lens having a positive refractive power, the second lens being disposed on the image side of the first lens, and
wherein a following conditional expression is satisfied:

$-0.3 < f2/ft < 0.0$; and $-1.0 < (R2n+R1n)/(R2n-R1n) < -0.2$

Where f2 represents a focal length of the second lens unit, ft represents a focal length of the zoom lens at the telephoto end, R1n represents a curvature radius of a lens surface on the object side of the first lens, and R2n represents a curvature radius of a lens surface on the image side of the first lens.

13. The image pickup system according to claim 12,
wherein the controlling unit is configured as a separate body from the zoom lens, and includes a transmission unit that transmits a control signal for controlling the zoom lens.

14. The image pickup system according to claim 12,
wherein the controlling unit is configured as a separate body from the zoom lens, and includes an operation unit that operates the zoom lens.

15. The image pickup system according to claim 12, further comprising a display unit configured to display information on zooming of the zoom lens.

* * * * *